United States Patent
Khare

(10) Patent No.: US 6,803,343 B2
(45) Date of Patent: Oct. 12, 2004

(54) DESULFURIZATION AND NOVEL SORBENT FOR SAME

(75) Inventor: Gyanesh P. Khare, Kingwood, TX (US)

(73) Assignee: ConocoPhillips Company, Houston, TX (US)

(*) Notice: Subject to any disclaimer, the term of this patent is extended or adjusted under 35 U.S.C. 154(b) by 0 days.

(21) Appl. No.: 09/976,195

(22) Filed: Oct. 12, 2001

(65) Prior Publication Data

US 2003/0070966 A1 Apr. 17, 2003

(51) Int. Cl.[7] ................................................ B01J 21/00
(52) U.S. Cl. .................... 502/514; 208/244; 208/208 R; 208/247; 208/299; 208/307; 208/217; 502/406; 502/407; 502/415
(58) Field of Search ............................ 208/244, 208 R, 208/247, 299, 307, 217; 502/406, 407, 415, 514

(56) References Cited

U.S. PATENT DOCUMENTS

| | | | |
|---|---|---|---|
| 4,654,317 A | 3/1987 | Sachtler et al. | 502/74 |
| 5,439,583 A | 8/1995 | Robinson et al. | 208/62 |
| 5,776,331 A | 7/1998 | Khare et al. | 708/247 |
| 5,792,438 A | 8/1998 | Scranton, Jr. | 423/244.02 |
| 5,914,292 A | 6/1999 | Khare et al. | 502/406 |
| 5,935,420 A | 8/1999 | Baird, Jr. et al. | 208/213 |
| 6,068,824 A * | 5/2000 | Kinoshita et al. | 423/239.1 |
| 6,254,766 B1 * | 7/2001 | Sughrue et al. | 208/244 |

* cited by examiner

Primary Examiner—Walter D. Griffin
Assistant Examiner—James Arnold, Jr.
(74) Attorney, Agent, or Firm—Lynda S. Jolly

(57) ABSTRACT

A sorbent composition comprising a support and a reduced-valence noble metal can be used to desulfurize a hydrocarbon-containing fluid such as cracked-gasoline or diesel fuel.

15 Claims, No Drawings

DESULFURIZATION AND NOVEL SORBENT FOR SAME

BACKGROUND OF THE INVENTION

This invention relates to a sorbent composition, a process of making a sorbent composition, and a process of using a sorbent composition for the removal of sulfur from a hydrocarbon-containing fluid.

Hydrocarbon-containing fluids such as gasoline and diesel fuels typically contain a quantity of sulfur. High levels of sulfur in such automotive fuels is undesirable because oxides of sulfur present in automotive exhaust may irreversibly poison noble metal catalysts employed in automobile catalytic converters. Emissions from such poisoned catalytic converters may contain high levels of non-combusted hydrocarbons, oxides of nitrogen, and/or carbon monoxide, which, when catalyzed by sunlight, form ground level ozone, more commonly referred to as smog.

Much of the sulfur present in the final blend of most gasolines originates from a gasoline blending component commonly known as "cracked-gasoline." Thus, reduction of sulfur levels in cracked-gasoline will inherently serve to reduce sulfur levels in most gasolines, such as, automobile gasolines, racing gasolines, aviation gasolines, boat gasolines, and the like.

Many conventional processes exist for removing sulfur from cracked-gasoline. However, most conventional sulfur removal processes, such as hydrodesulfurization, tend to saturate olefins and aromatics in the cracked-gasoline and thereby reduce its octane number (both research and motor octane number). Thus, there is a need for a process wherein desulfurization of cracked-gasoline is achieved while the octane number is maintained.

In addition to the need for removing sulfur from cracked-gasoline, there is also a need to reduce the sulfur content in diesel fuel. In removing sulfur from diesel fuel by hydrodesulfurization, the cetane is improved but there is a large cost in hydrogen consumption. Such hydrogen is consumed by both hydrodesulfurization and aromatic hydrogenation reactions. Thus, there is a need for a process wherein desulfurization is achieved without a significant consumption of hydrogen so as to provide a more economical process for the desulfurization of hydrocarbon-containing fluids.

SUMMARY OF THE INVENTION

It is thus an object of the present invention to provide a novel sorbent system for the removal of sulfur from hydrocarbon-containing fluid streams such as cracked-gasoline and diesel fuels.

Another object of this invention is to provide a method of making a novel sorbent which is useful in the desulfurization of such hydrocarbon-containing fluid streams.

Still another object of this invention is to provide a process for the removal of sulfur-containing compounds from hydrocarbon-containing fluid streams which minimizes saturation of olefins and aromatics therein.

A further object of this invention is to provide a process for the removal of sulfur-containing compounds from hydrocarbon-containing fluid streams which minimizes hydrogen consumption.

It should be noted that the above-listed objects need not all be accomplished by the invention claimed herein and other objects and advantages of this invention will be apparent from the following description of the invention and appended claims.

In one aspect of the present invention, there is provided a novel sorbent composition suitable for removing sulfur from a hydrocarbon-containing fluid. The sorbent composition comprises a reduced-valence noble metal, zinc oxide, and a carrier.

In accordance with another aspect of the present invention, there is provided a process of making a sorbent composition. The process comprises the steps of: admixing zinc oxide and a carrier so as to form a support mix; particulating the support mix so as to form a support particulate; incorporating the support particulate with a noble metal or a noble metal-containing compound to provide a promoted particulate comprising an unreduced noble metal; and reducing the promoted particulate to provide a reduced sorbent composition comprising a reduced-valence noble metal.

In accordance with a further aspect of the present invention, there is provided a process for removing sulfur from a hydrocarbon-containing fluid stream. The process comprises the steps of: contacting the hydrocarbon-containing fluid stream with a sorbent composition comprising a reduced-valence noble metal and a support in a desulfurization zone under conditions such that there is formed a desulfurized fluid stream and a sulfurized sorbent; separating the desulfurized fluid stream from the sulfurized sorbent; regenerating at least a portion of the separated sulfurized sorbent in a regeneration zone so as to remove at least a portion of the sulfur therefrom and provide a regenerated desulfurized sorbent; reducing the desulfurized sorbent in an activation zone to provide a reduced sorbent composition which will effect the removal of sulfur from the hydrocarbon-containing fluid stream when contacted with the same; and returning at least a portion of the reduced sorbent composition to the desulfurization zone.

DETAILED DESCRIPTION OF THE INVENTION

In accordance with a first embodiment of the present invention, a novel sorbent composition suitable for removing sulfur from hydrocarbon-containing fluids is provided. The sorbent composition comprises a support and a reduced-valence noble metal.

The support may be any component or combination of components which can be used as a support for the sorbent composition of the present invention to help promote the desulfurization process of the present invention. Preferably, the support is an active component of the sorbent composition. Examples of suitable support components include, but are not limited to, zinc oxide and any suitable inorganic and/or organic carriers. Examples of suitable inorganic carriers include, but are not limited to, silica, silica gel, alumina, diatomaceous earth, expanded perlite, kieselguhr, silica-alumina, titania, zirconia, zinc aluminate, zinc titanate, zinc silicate, magnesium aluminate, magnesium titanate, synthetic zeolites, natural zeolites, and combinations thereof. Examples of suitable organic carriers include, but are not limited to, activated carbon, coke, charcoal, carbon-containing molecular sieves, and combinations thereof. A preferred support comprises zinc oxide, silica, and alumina.

When the support comprises zinc oxide, the zinc oxide used in the preparation of the sorbent composition of the present invention can be either in the form of zinc oxide, such as powdered zinc oxide, or in the form of one or more zinc compounds that are convertible to zinc oxide under the conditions of preparation described herein. Examples of suitable zinc compounds include, but are not limited to, zinc sulfide, zinc sulfate, zinc hydroxide, zinc carbonate, zinc acetate, zinc nitrate, and combinations thereof. Preferably, the zinc oxide is in the form of powdered zinc oxide.

When the support comprises zinc oxide, the zinc oxide will generally be present in the sorbent composition of the present invention in an amount in the range of from about 10 to about 90 weight percent zinc oxide based on the total weight of the sorbent composition, preferably in an amount in the range of from about 15 to about 80 weight percent zinc oxide, and most preferably in an amount in the range of from 20 to 70 weight percent zinc oxide.

When the support comprises silica, the silica used in the preparation of the sorbent composition of the present invention can be either in the form of silica or in the form of one or more silicon compounds. Any suitable type of silica may be employed in preparing the sorbent composition of the present invention. Examples of suitable types of silica include, but are not limited to, diatomite, expanded perlite, silicalite, silica colloid, flame-hydrolyzed silica, hydrolyzed silica, silica gel, precipitated silica, and combinations thereof. In addition, silicon compounds that are convertible to silica such as silicic acid, ammonium silicate and the like and combinations thereof can also be employed. Preferably, the silica is in the form of diatomite or expanded perlite.

When the support comprises silica, the silica will generally be present in the sorbent composition of the present invention in an amount in the range of from about 5 to about 85 weight percent silica based on the total weight of the sorbent composition, preferably in an amount in the range of from about 10 to about 60 weight percent silica, and most preferably in an amount in the range of from 15 to 55 weight percent silica.

When the support comprises alumina, the alumina used in preparing the sorbent composition of the present invention can be present in the source of silica, can be any suitable commercially available alumina material (including, but not limited to, colloidal alumina solutions, hydrated aluminas, and, generally, those alumina compounds produced by the dehydration of alumina hydrates), or both. The preferred alumina is a hydrated alumina such as, for example, boehmite or pseudoboehmite.

When the support comprises alumina, the alumina will generally be present in the sorbent composition of the present invention in an amount in the range of from about 1 to about 30 weight percent alumina based on the total weight of the sorbent composition, preferably in an amount in the range of from about 5 to about 20 weight percent alumina, and most preferably in an amount in the range of from 5 to 15 weight percent alumina.

The sorbent composition of the present invention further comprises a noble metal. The noble metal can be present in the form of an elemental noble metal, a noble metal-containing compound, a noble metal oxide, or a noble metal oxide precursor. The metal component of the noble metal is preferably selected from the group consisting of platinum, palladium, rhodium, ruthenium, osmium, iridium, and combinations thereof. Most preferably, the metal component of the noble metal is platinum.

A portion, preferably a substantial portion, of the noble metal is present in the form of a reduced-valence noble metal. The valence of the reduced-valence noble metal is reduced to a value which is less than the valence of the noble metal in its common oxidized state, preferably less than 3, more preferably less than 2, and most preferably 0.

The noble metal will generally be present in the sorbent composition of the present invention in an amount in the range of from about 0.05 to about 30 weight percent noble metal based on the total weight of the sorbent composition, preferably in an amount in the range of from about 0.1 to 15 weight percent noble metal, and most preferably in an amount in the range of from 0.2 to 5 weight percent noble metal.

It is preferred that at least 10 weight percent of the noble metal present in the sorbent composition is in the form of a reduced-valence noble metal, more preferably at least 40 weight percent of the noble metal is a reduced-valence noble metal, and most preferably at least 80 weight percent of the noble metal is a reduced-valence noble metal.

The reduced-valence noble metal will generally be present in the sorbent composition of the present invention in an amount in the range of from about 0.01 to about 25 weight percent reduced-valence noble metal based on the total weight of the sorbent composition, preferably in an amount in the range of from about 0.1 to 10 weight percent reduced-valence noble metal, and most preferably in an amount in the range of from 0.2 to 4 weight percent reduced-valence noble metal.

In accordance with a second embodiment of the present invention, a process for making the inventive sorbent composition of the first embodiment of the present invention is provided.

In the manufacture of the sorbent composition of the present invention, the support is generally prepared by combining the support compounds, described above, together in appropriate proportions, described above, by any suitable method or manner known in the art which provides for the intimate mixing of such components to thereby provide a substantially homogeneous mixture comprising the support components, preferably a substantially homogeneous mixture comprising zinc oxide, silica, and alumina. Any suitable means for mixing the support component can be used to achieve the desired dispersion of the components. Examples of suitable means for mixing include, but are not limited to, mixing tumblers, stationary shells or troughs, Muller mixers, which are of the batch or continuous type, impact mixers, and the like. It is presently preferred to use a Muller mixer as the means for mixing the support components.

The support components are contacted together by any manner known in the art to provide a resulting mixture which can be in a form selected from the group consisting of a wet mix, a dough, a paste, a slurry, and the like. Such resulting support mixture can then be shaped to form a particulate(s) selected from the group consisting of a granulate, an extrudate, a tablet, a sphere, a pellet, a microsphere, and the like. For example, if the resulting support mixture is in the form of a wet mix, the wet mix can be densified, dried, calcined, and thereafter shaped, or particulated, through the granulation of the densified, dried, calcined mix to form granulates. Also for example, when the resulting support mixture is in the form of either a dough state or paste state, such resulting mixture can then be shaped, preferably extruded, to form a particulate, preferably cylindrical extrudates having a diameter in the range of from about 1/32 inch to 1/2 inch and any suitable length, preferably a length in the range of from about 1/8 inch to about 1 inch. The resulting support particulates, preferably cylindrical extrudates, are then dried and calcined under conditions as disclosed herein.

More preferably, the resulting support mixture is in the form of a slurry and the particulation of such slurry is achieved by spray drying the slurry to form micro-spheres thereof having a mean particle size generally in the range of from about 1 micrometer to about 500 micrometers, preferably in the range of from about 10 micrometers to about 300 micrometers. Spray drying is known in the art and is discussed in *Perry's Chemical Engineers' Handbook*, Sixth Edition, published by McGraw-Hill, Inc., at pages 20–54 through 20–58. Additional information can be obtained from the *Handbook of Industrial Drying*, published by Marcel Dekker. Inc., at pages 243 through 293. As used herein, the term "mean particle size" refers to the size of the particulate material as determined by using a RO-TAP Testing Sieve Shaker, manufactured by W. S. Tyler Inc., of Mentor, Ohio, or other comparable sieves. The material to be measured is placed in the top of a nest of standard eight inch diameter stainless steel framed sieves with a pan on the bottom. The material undergoes sifting for a period of about 10 minutes; therafter, the material retained on each sieve is weighed. The percent retained on each sieve is calculated by dividing the weight of the material retained on a particular sieve by the weight of the original sample. This information is used to compute the mean particle size.

The spray dried support particulate can then be dried under a drying condition as disclosed herein and calcined under a calcining condition as disclosed herein. Preferably, calcining is conducted in an oxidizing atmosphere, such as in the presence of oxygen or air, to form a dried and calcined support particulate. The calcination can be conducted under any suitable condition that removes residual water and oxidizes and combustibles.

The resulting dried and calcined support particulate is then incorporated with the noble metal, described above. The noble metal may be incorporated in, on, or with the dried and calcined support particulate by any suitable means or method known in the art such as, for example, impregnating, soaking, spraying, and combinations thereof. The preferred method of incorporating the noble metal into the dried and calcined support particulate is impregnating using standard incipient wetness impregnation techniques. The preferred method uses an impregnating solution comprising the desired concentration of the noble metal so as to ultimately provide a promoted particulate which can be subjected to drying, calcining, and reduction to provide the sorbent composition of the present invention. The impregnating solution can be any aqueous or an organic solvent solution in amounts of such solution which suitably provides for the impregnation of the dried and calcined support particulates. A preferred impregnating solution is formed by dissolving a noble metal-containing compound in water. It is acceptable to use somewhat of an acidic solution to aid in the dissolution of the noble metal-containing compound. It is more preferred for the particulates to be impregnated with the noble metal by use of a solution containing tetraamine platinum(II) nitrate dissolved in water.

Generally, the amount of the noble metal incorporated, preferably impregnated, onto, into, or with the support is an amount which provides, after the promoted particulate material has been dried calcined, and reduced, a sorbent composition having an amount of the reduced-valence noble metal as disclosed herein.

Once the noble metal has been incorporated in, on, or with the dried and calcined support particulate, the noble metal-promoted particulates are subsequently dried and calcined under conditions disclose herein to thereby provide a dried, calcined, noble metal-promoted particulate comprising an unreduced noble metal.

Generally, a drying condition, as referred to herein, can include a temperature in the range of from about 180° F. to about 290° F., preferably in the range of from about 190° F. to about 280° F., and more preferably in the range of from 200° F. to 270° F. Such drying condition can also include a time period generally in the range of from about 0.5 hour to about 60 hours, preferably in the range of from about 1 hour to about 40 hours, and more preferably in the range of from 1.5 hours to 20 hours. Such drying condition can also include a pressure generally in the range of from about sub-atmospheric (i.e., about 28 inches of mercury) to about 150 pounds per square inch absolute (psia), preferably in the range of from about atmospheric to about 100 psia, more preferably about atmospheric, so long as the desired temperature can be maintained. Any drying method(s) known to one skilled in the art such as, for example, air drying, heat drying, vacuum drying, and the like and combinations thereof can be used.

Generally, a calcining condition, as referred to herein, can include a temperature in the range of from about 400° F. to about 1800° F., preferably in the range of from about 500° F. to about 1600° F., and more preferably in the range of from 800° F. to about 1500° F. Such calcining condition can also include a time period generally in the range of from about 1 hour to about 60 hours, preferably in the range of from about 2 hours to about 20 hours, and more preferably in the range of from 3 hours to 15 hours. Such calcining condition can also include a pressure, generally in the range of from about 7 pounds per square inch absolute (psia) to about 750 psia, preferably in the range of from about 7 psia to about 450 psia, and more preferably in the range of from 7 psia to 150 psia.

The dried, calcined, noble metal-promoted particulates are thereafter subjected to reduction with a suitable reducing agent, preferably hydrogen, under reducing conditions, to thereby provide a reduced sorbent composition comprising a reduced-valence noble metal having a valence which is less than that of the unreduced noble metal. Reduction can be carried out at a temperature in the range of from about 100° F. to about 1500° F. and at a pressure in the range of from about 15 pounds per square inch absolute (psia) to about 1,500 psia. Such reduction is carried out for a time period sufficient to achieve the desired level of noble metal reduction. Such reduction can generally be achieved in a time period in the range of from about 0.01 hour to about 20 hours.

In accordance with a third embodiment of the present invention, a desulfurization process is provided which employs the novel sorbent composition described herein.

The hydrocarbon-containing fluid feed employed in the desulfurization process of this embodiment of the present invention is preferably a sulfur-containing hydrocarbon fluid, more preferably, gasoline or diesel fuel, most preferably cracked-gasoline or diesel fuel.

The hydrocarbon-containing fluid described herein as suitable feed in the process of the present invention comprises a quantity of olefins, aromatics, sulfur, as well as paraffins and naphthenes. The amount of olefins in gaseous cracked-gasoline is generally in the range of from about 10 to about 35 weight percent olefins based on the total weight of the gaseous cracked-gasoline. For diesel fuel there is essentially no olefin content. The amount of aromatics in gaseous cracked-gasoline is generally in the range of from about 20 to about 40 weight percent aromatics based on the total weight of the gaseous cracked-gasoline. The amount of aromatics in gaseous diesel fuel is generally in the range of from about 10 to about 90 weight percent aromatics based on the total weight of the gaseous diesel fuel. The amount of sulfur in the hydrocarbon-containing fluid, preferably cracked-gasoline or diesel fuel, suitable for use in a process of the present invention can be in the range of from about 100 parts per million sulfur by weight of the cracked-gasoline to about 10,000 parts per million sulfur by weight of the cracked-gasoline and from about 100 parts per million sulfur by weight of the diesel fuel to about 50,000 parts per million sulfur by weight of the diesel fuel prior to the treatment of such hydrocarbon-containing fluid with the process of the present invention. The amount of sulfur in the desulfurized hydrocarbon-containing fluid following treatment in accordance with the process of the present invention is less than about 100 parts per million (ppm) sulfur by weight of hydrocarbon-containing fluid, preferably less than about 90 ppm sulfur by weight of hydrocarbon-containing fluid, and more preferably less than about 80 ppm sulfur by weight of hydrocarbon-containing fluid.

As used herein, the term "gasoline" denotes a mixture of hydrocarbons boiling in the range of from about 100° F. to about 400° F., or any fraction thereof. Examples of suitable gasoline include, but are not limited to, hydrocarbon streams in refineries such as naphtha, straight-run naphtha, coker naphtha, catalytic gasoline, visbreaker naphtha, alkylate, isomerate, reformate, and the like and combinations thereof.

As used herein, the term "cracked-gasoline" denotes a mixture of hydrocarbons boiling in the range of from about 100° F. to about 400° F., or any fraction thereof, that are products from either thermal or catalytic processes that crack larger hydrocarbon molecules into smaller molecules. Examples of suitable thermal processes include, but are not limited to, coking, thermal cracking, visbreaking and the like and combinations thereof. Examples of suitable catalytic cracking processes include, but are not limited to fluid catalytic cracking, heavy oil cracking, and the like and combinations thereof. Thus, examples of suitable cracked-gasoline include, but are not limited to, coker gasoline, thermally cracked gasoline, visbreaker gasoline, fluid catalytically cracked gasoline, heavy oil cracked gasoline, and the like and combinations thereof. In some instances, the cracked-gasoline may be fractionated and/or hydrotreated prior to desulfurization when used as a hydrocarbon-containing fluid in a process of the present invention.

As used herein, the term "diesel fuel" denotes a mixture of hydrocarbons boiling in the range of from about 300° F. to about 750° F., or any fraction thereof. Examples of suitable diesel fuels include, but are not limited to, light cycle oil, kerosene, jet fuel, straight-run diesel, hydrotreated diesel, and the like and combinations thereof.

As used herein, the term "sulfur" denotes sulfur in any form such as elemental sulfur or a sulfur compound normally present in a hydrocarbon-containing fluid such as cracked gasoline or diesel fuel. Examples of sulfur which can be present during a process of the present invention, usually contained in a hydrocarbon-containing fluid, include, but are not limited to, hydrogen sulfide, carbonyl sulfide (COS), carbon disulfide ($CS_2$), mercaptans (RSH), organic sulfides (R—S—R), organic disulfides (R—S—S—R), thiophene, substituted thiophenes, organic trisulfides, organic tetrasulfides, benzothiophene, alkyl thiophenes, alkyl benzothiophenes, alkyl dibenzothiophenes, and the like and combinations thereof as well as the heavier molecular weights of same which are normally present in a diesel fuel of the types contemplated for use in a process of the present invention, wherein each R can be an alkyl or cycloalkyl or aryl group containing one carbon atom to ten carbon atoms.

As used herein, the term "fluid" denotes gas, liquid, vapor, and combinations thereof.

As used herein, the term "gaseous" denotes that state in which the hydrocarbon-containing fluid, such as cracked-gasoline or diesel fuel, is primarily in a gas or vapor phase.

The desulfurizing of the hydrocarbon-containing fluid is carried out in a desulfurization zone under a set of conditions that includes total pressure, temperature, weight hourly space velocity, and hydrogen flow. These conditions are such that the sorbent composition can desulfurize the hydrocarbon-containing fluid to produce a desulfurized hydrocarbon-containing fluid and a sulfurized sorbent composition.

In desulfurizing the hydrocarbon-containing fluid, it is preferred that the hydrocarbon-containing fluid, preferably cracked-gasoline or diesel fuel, be in a gas or vapor phase. However, in the practice of the present invention it is not essential that the hydrocarbon-containing fluid be totally in a gas or vapor phase.

In desulfurizing the hydrocarbon-containing fluid, the total pressure can be in the range of from about 15 pounds per square inch absolute (psia) to about 1500 psia. However, it is presently preferred that the total pressure be in a range of from about 50 psia to about 500 psia. In general, the temperature should be sufficient to keep the hydrocarbon-containing fluid in essentially a vapor or gas phase. While such temperatures can be in the range of from about 100° F. to about 1000° F., it is presently preferred that the temperature be in the range of from about 400° F. to about 800° F. when treating a cracked-gasoline and in the range of from about 500° F. to about 900° F. when treating a diesel fuel.

Weight hourly space velocity (WHSV) is defined as the numerical ratio of the rate at which a hydrocarbon-containing fluid is charged to the desulfurization zone in pounds per hour at standard condition of temperature and pressure (STP) divided by the pounds of sorbent composition contained in the desulfurization zone to which the hydrocarbon-containing fluid is charged. In the practice of the present invention, such WHSV should be in the range of from about 0.5 $hr^{-1}$ to about 50 $hr^{-1}$, preferably in the range of from about 1 $hr^{-1}$ to about 20 $hr^{-1}$. The desulfurizing (i.e., desulfurization) of the hydrocarbon-containing fluid should be conducted for a time sufficient to affect the removal of at least a substantial portion sulfur from such hydrocarbon-containing fluid.

In desulfurizing the hydrocarbon-containing fluid, it is presently preferred that an agent be employed which interferes with any possible chemical or physical reacting of the olefinic and aromatic compounds in the hydrocarbon-containing fluid which is being treated with a sorbent composition of the present invention. Preferably, such agent is hydrogen. Hydrogen flow in the desulfurization zone is generally such that the mole ratio of hydrogen to hydrocarbon-containing fluid is the range of from about 0.1 to about 10, preferably in the range of from about 0.2 to about 3.

If desired, during the desulfurizing of the hydrocarbon-containing fluid according to the process of the present invention, a diluent such as methane, carbon dioxide, flue gas, nitrogen and the like and combinations thereof can be used. Thus, it is not essential to the practice of a process of the present invention that a high purity hydrogen be employed in achieving the desired desulfurization of a hydrocarbon-containing fluid such as cracked-gasoline or diesel fuel.

It is presently preferred, when the desulfurization zone is in a fluidized bed reactor system, that a sorbent composition be used having a mean particle size, as described herein, in the range of from about 1 micrometer to about 500 micrometers. Preferably, such sorbent composition has a mean particle size in the range of from about 10 micrometers to about 300 micrometers When a fixed bed reactor system is employed as the desulfurization zone of the present invention, the sorbent composition should generally have a particulate size in the range of from about 1/32 inch to about 1/2 inch diameter, preferably in the range of from about 1/32 inch to about 1/4 inch diameter. It is further presently preferred to use a sorbent composition having a surface area in the range of from about 1 square meter per gram to about 1000 square meters per gram ($m^2/g$), preferably in the range of from about 1 $m^2/g$ to about 800 $m^2/g$.

After sulfur removal in the desulfurization zone, the desulfurized hydrocarbon-containing fluid and sulfurized sorbent composition can then be separated by any manner or method known in the art that can separate a solid from a fluid, preferably a solid from a gas. Examples of suitable separating means for separating solids and gases include, but are not limited to, cyclonic devices, settling chambers, impingement devices, filters, and combinations thereof. The desulfurized hydrocarbon-containing fluid, preferably desulfurized gaseous cracked-gasoline or desulfurized gaseous diesel fuel, can then be recovered and preferably liquefied. Liquefaction of such desulfurized hydrocarbon-containing fluid can be accomplished by any manner or method known in the art.

The sulfurized sorbent is then regenerated in a regeneration zone under a set of conditions that includes temperature, total pressure, and sulfur removing agent partial pressure. The regenerating is carried out at a temperature generally in the range of from about 100° F. to about 1500° F., preferably in the range of from about 800° F. to about 1200° F. Total pressure is generally in the range of from about 25 pounds per square inch absolute (psia) to about 500 psia. The sulfur removing agent partial pressure is generally in the range of from about 1 percent to about 100 percent of the total pressure.

The sulfur removing agent, i.e., regenerating agent, is a composition(s) that helps to generate gaseous sulfur-containing compounds and oxygen-containing compounds such as sulfur dioxide, as well as to burn off any remaining hydrocarbon deposits that might be present. The preferred sulfur removing agent, i.e., regenerating agent, suitable for use in the regeneration zone is oxygen or an oxygen-containing gas(es) such as air. Such regeneration is carried out for a time sufficient to achieve the desired level of regeneration. Such regeneration can generally be achieved in a time period in the range of from about 0.1 hour to about 24 hours, preferably in the range of from about 0.5 hour to about 3 hours.

In carrying out the process of the present invention, a stripper zone can be inserted before and/or after, preferably before, regenerating the sulfurized sorbent composition in the regeneration zone. Such stripper zone, preferably utilizing a stripping agent, will serve to remove a portion, preferably all, of any hydrocarbon(s) from the sulfurized sorbent composition. Such stripper zone can also serve to remove oxygen and sulfur dioxide from the system prior to introduction of the regenerated sorbent composition into the activation zone. Such stripping employs a set of conditions that includes total pressure, temperature, and stripping agent partial pressure.

Preferably, the stripping, when employed, is carried out at a total pressure in the range of from about 25 pounds per square inch absolute (psia) to about 500 psia. The temperature for such stripping can be in the range of from about 100° F. to about 1000° F. Such stripping is carried out for a time sufficient to achieve the desired level of stripping. Such stripping can generally be achieved in a time period in the range of from about 0.1 hour to about 4 hours, preferably in the range of from about 0.3 hour to about 1 hour. The stripping agent is a composition(s) that helps to remove a hydrocarbon(s) from the sulfurized sorbent composition. Preferably, the stripping agent is nitrogen.

After regeneration, and optionally stripping, the desulfurized sorbent composition is then subjected to reducing, i.e., activating, in an activation zone with a reducing agent, preferably hydrogen, so that at least a portion of the unreduced noble metal incorporated on, in, or with the sorbent composition is reduced to thereby provide a reduced sorbent composition comprising a reduced-valence noble metal. Such reduced-valence noble metal is incorporated on, in, or with such sorbent composition in an amount that provides for the removal of sulfur from the hydrocarbon-containing fluid according to a process of the present invention.

In general, when practicing the process of the present invention, the reducing, i.e., activating, of the desulfurized sorbent composition is carried out at a temperature in the range of from about 100° F. to about 1500° F. and at a pressure in the range of from about 15 pounds per square inch absolute (psia) to about 1500 psia. Such reduction is carried out for a time sufficient to achieve the desired level of noble metal reduction. Such reduction can generally be achieved in a time period in the range of from about 0.01 hour to about 20 hours.

Following the reducing, i.e., activating, of the regenerated, desulfurized sorbent composition, at least a portion of the resulting reduced (i.e., activated) sorbent composition can be returned to the desulfurization zone.

When carrying out the desulfurization process of the present invention, the steps of desulfurizing, regenerating, reducing (i.e., activating), and optionally stripping before and/or after such regenerating, can be accomplished in a single zone or vessel or in multiple zones or vessels. The desulfurization zone can be any zone wherein desulfurizing a hydrocarbon-containing fluid such as cracked-gasoline, diesel fuel or the like can take place. The regeneration zone can be any zone wherein regenerating or desulfurizing a sulfurized sorbent composition can take place. The activation zone can be any zone wherein reducing, i.e., activating, a regenerated, desulfurized sorbent composition can take place. Examples of suitable zones are fixed bed reactors, moving bed reactors, fluidized bed reactors, transport reactors, reactor vessels and the like.

When carrying out the process of the present invention in a fixed bed reactor system, the steps of desulfurizing, regenerating, reducing, and optionally stripping before and/or after such regenerating are accomplished in a single zone or vessel. When carrying out the process of the present invention in a fluidized bed reactor system, the steps of desulfurizing, regenerating, reducing, and optionally stripping before and/or after such regenerating are accomplished in multiple zones or vessels.

When the desulfurized hydrocarbon-containing fluid resulting from the practice of a process of the present invention is a desulfurized cracked-gasoline, such desulfurized cracked-gasoline can be used in the formulation of gasoline blends to provide gasoline products suitable for commercial consumption and can also be used where a cracked-gasoline containing low levels of sulfur is desired.

When the desulfurized hydrocarbon-containing fluid resulting from the practice of a process of the present invention is a desulfurized diesel fuel, such desulfurized diesel fuel can be used in the formulation of diesel fuel blends to provide diesel fuel products suitable for commercial consumption and can also be used where a diesel fuel containing low levels of sulfur is desired.

The following example is presented to further illustrate this invention and is not to be construed as unduly limiting the scope of this invention.

EXAMPLE

This example demonstrates that a noble metal-promoted sorbent composition comprising a reduced-valence noble metal, zinc oxide, alumina, and silica is effective to desulfurize cracked-gasoline.

Batch 1 of the support for the inventive sorbent was made by mixing 22.0 lbs. of distilled water and 315.79 grams of acetic acid in a Cowles dissolver to create a water/acid solution. A 6.375 lb. quantity of aluminum hydroxide powder (Disperal Alumina Powder, available from CONDEA Vista Company, Houston, Tex.) was added to the water/acid solution and mixed for 30 minutes to create an alumina slurry. A 20.02 lb. quantity of diatomaceous earth (Celite™ Filter Cell, available from Mansville Sale Corporation, Lampoc, Calif.) and a 25.03 lb. quantity of zinc oxide powder (available from Zinc Corporation, Monaca, Pa.) were mixed together for 15 minutes to create powdered mixture. The powdered mixture was slowly added to the alumina slurry over a period of about 15 minutes and then mixed for about 25 minutes to create a sorbent base slurry.

The sorbent base slurry was then formed into sorbent base particulate using a counter-current spray drier (Niro Atomizer Model 68, available from Niro Atomizer Inc., Columbia, Md.). The sorbent base slurry was charged to the spray drier wherein it was contacted in a particulating chamber with air flowing through the chamber. The air flowing through the chamber had an inlet temperature of approximately 320° C. and an outlet temperature of approximately 140° C., and operated to partially dry the sorbent base slurry into a sorbent base particulate. The sorbent base particulate was then further dried in an oven by ramping the oven temperature at 3° C./min to 150° C. and holding at 150° C. for 1 hour. The dried sorbent base particulate was then calcined by ramping the oven temperature at 5° C./min to 635° C. and holding at 635° C. for 1 hour.

Batches 2, 3, and 4 of the sorbent support were made using the same process as Batch 1, except the powdered mixture and alumina slurry were mixed for 30 minutes, rather than 25 minutes, to make the sorbent base slurry. The sorbent base particulate of Batches 1–4 were then mixed together prior to impregnation with the noble metal promoter.

A 90 gram quantity of the mixed sorbent base particulate of Batches 1–4 was then impregnated with 27 grams of a tetraamine platinum (II) nitrate solution (containing 2% Pt) using incipient wetness techniques and dried for 30 minutes using a blow drier. The impregnated sorbent was then put in an oven and further dried by ramping the oven temperature at 2° C./min to 120° C. and holding at 120° C. for 1 hour. The dried sorbent was then calcined by ramping the oven temperature at 2° C./min to 510° C. and holding at 510° C. for 1 hour. The resulting noble metal-promoted sorbent contained about 0.6 wt. % platinum.

The platinum-promoted sorbent was then sieved to provide a 10 gram quantity of platinum-promoted sorbent which passed through the 50 mesh sieve but was retained above the 230 mesh sieve (i.e., −50/+230 mesh). The 10 gram quantity of platinum-promoted sorbent was placed in a reactor (1 inch I.D. fluidized bed reactor with clam shell heater) and heated to 700° F. in flowing nitrogen at a rate of 150 cc/min for a period of 30 minutes. The nitrogen was then turned off and hydrogen was charged to the 700° F. reactor at a rate of 300 cc/min for 75 minutes to reduce the platinum-promoted sorbent.

Catalytically cracked gasoline (CCG) having a sulfur content of 345 ppmw was then charged to the 728° F. reactor at a rate of 13.4 ml/hr. Simultaneously with the CCG, nitrogen and hydrogen were charged to the reactor at 150 cc/min and 150 cc/min, respectively. After 1 hour, a 9.54 gram effluent sample was taken from the 749° F. reactor and designated Sample 1A. After 2 hours, a 10.21 gram effluent sample was taken from the 759° F. reactor and designed Sample 2A. After 3 hours, a 13.35 gram effluent sample was taken from the 739° F. reactor and designated Sample 3A. After 4 hours, a 12.41 gram effluent sample was taken from the 714° F. reactor and designated Sample 4A.

The CCG and hydrogen flow to the reactor was then terminated and the reactor temperature was reduced to about 230° C. The reactor temperature was then increased to 900° F. in flowing nitrogen at 240 cc/min over a period of 45 minutes. The platinum-promoted sorbent was then oxidized by charging air to the 907° F. reactor at 60 cc/min for 75 minutes. The air was then turned off and the reactor temperature was reduced to, and maintained at, 700° F. for 20 minutes. Hydrogen was then charged to the 720° F. reactor at a rate of 300 cc/min for 83 minutes to reduce the platinum-promoted sorbent. CCG having a sulfur content of 345 ppmw was then charged to the 720° F. reactor at a rate of 13.4 ml/hr, along with nitrogen and hydrogen flowing at a rate of 240 cc/min and 300 cc/min, respectively. After 1 hour, a 7.7 gram effluent sample was taken from the 759° F. reactor and designated Sample 1B. After 2 hours, a 15.72 gram effluent sample was taken from the 767° F. reactor and designated Sample 2B. After 3 hours, a 11.04 gram effluent sample was taken from the 768° F. reactor and designated Sample 3B. After 4 hours, a 9.47 gram effluent sample was taken from the 766° F. reactor and designated Sample 4B. The CCG and hydrogen flow to the reactor was then terminated and the reactor temperature was reduced to about 230° C.

Samples 1A–4A (Cycle A) and 1B–4B (Cycle B) were then analyzed for sulfur content using x-ray fluorescence. The results are summarized in Table 1.

TABLE 1

Desulfurization of CCG Containing
345 ppmw Sulfur with Reduced-Valence Platinum-Promoted Sorbent

| Sample | Cycle A (ppmw Sulfur) | Cycle B (ppmw Sulfur) |
|---|---|---|
| 1 | 5 | 5 |
| 2 | <5 | 10 |
| 3 | 10 | 15 |
| 4 | 45 | 15 |

As can readily be seen from Table 1, the reduced-valence noble metal-promoted sorbent composition of the present invention is effective for removing sulfur from catalytically cracked gasoline.

Reasonably variations, modifications, and adaptations can be made within the scope of this disclosure and the appended claims without departing from the scope of this invention.

What is claimed is:

1. A process of making a sorbent composition, said process comprising the steps of:
   (a) admixing zinc oxide and a carrier to provide a support mix;
   (b) particulating the support mix to provide a support particulate;
   (c) incorporating said support particulate with a noble metal to provide a promoted particulate comprising an unreduced noble metal; and
   (d) reducing said promoted particulate to provide a reduced sorbent composition comprising a reduced-valence noble metal.

2. A process in accordance with claim 1 wherein said reduced-valence noble metal has a valence which is less than the valence of said unreduced noble metal.

3. A process in accordance with claim 2 wherein said carrier comprises a silica compound and an alumina compound.

4. A process in accordance with claim 1 wherein said reduced-valence noble metal has a valence of less than 2.

5. A process in accordance with claim 4 wherein said promoted particulate is dried and calcined before reduction.

6. A process in accordance with claim 5 wherein said support particulate is dried and calcined before incorporation with said noble metal.

7. A process in accordance with claim 6 wherein said reduced-valence noble metal comprises platinum.

8. A process in accordance with claim 1 wherein said support mix is selected from the group consisting of a wet mix, a dough, a paste, and a slurry, and wherein said support particulate is selected from the group consisting of a granulate, an extrudate, a tablet, a sphere, a pellet, and a microsphere.

9. A process in accordance with claim 8 wherein said support particulate comprises a microsphere.

10. A process in accordance with claim 1 wherein said support mix is in the form of a slurry and said particulating comprises spray drying said slurry to form a microsphere.

11. A process in accordance with claim 10 wherein said microsphere has a mean particle size in the range of from about 1 micrometer to about 500 micrometers.

12. A process in accordance with claim 1 wherein said incorporating is selected from the group consisting of impregnating, soaking, spraying, and combinations thereof.

13. A process in accordance with claim 1 wherein said incorporating comprises incipient wetness impregnation.

14. A process in accordance with claim 1 wherein said reduced-valence noble metal has a valence of zero.

15. A process in accordance with claim 14 wherein said reduced-valence noble metal component comprises platinum.

* * * * *